United States Patent [19]

McClelland

[11] Patent Number: 4,580,571
[45] Date of Patent: Apr. 8, 1986

[54] SEMI-TRANSPARENT SOLAR ENERGY THERMAL STORAGE DEVICE

[75] Inventor: John F. McClelland, Ames, Iowa

[73] Assignee: Iowa State University Research Foundation, Inc., Ames, Iowa

[21] Appl. No.: 612,715

[22] Filed: May 21, 1984

Related U.S. Application Data

[63] Continuation of Ser. No. 405,067, Aug. 4, 1982, Pat. No. 4,523,577.

[51] Int. Cl.[4] ................................................. F24J 3/02
[52] U.S. Cl. ..................................... 126/430; 126/431; 126/900; 126/901; 165/10
[58] Field of Search .............. 126/428, 430, 431, 900, 126/901, 400; 165/49, 10; 52/171

[56] References Cited

U.S. PATENT DOCUMENTS

| 504,544 | 9/1893 | Van Der Heyden | 126/431 X |
|---|---|---|---|
| 1,742,861 | 1/1930 | Johnson | 126/428 X |
| 1,957,279 | 5/1934 | Linke | 126/428 X |
| 3,107,052 | 10/1963 | Garrison | 126/428 X |
| 3,981,293 | 9/1976 | Gillery | 126/441 |
| 3,981,294 | 9/1976 | Deminet et al. | 126/900 X |
| 4,093,352 | 6/1978 | Pisar | 126/431 X |
| 4,108,373 | 8/1978 | Chiapale et al. | 126/900 X |
| 4,286,009 | 8/1981 | Griest | 126/901 X |
| 4,286,576 | 9/1981 | McClelland | 126/428 |
| 4,347,835 | 9/1982 | Seemann | 126/431 |

FOREIGN PATENT DOCUMENTS

| 2749182 | 5/1979 | Fed. Rep. of Germany | 126/428 |
|---|---|---|---|
| 2911552 | 10/1980 | Fed. Rep. of Germany | 126/901 |
| 0144751 | 11/1979 | Japan | 126/430 |

OTHER PUBLICATIONS

Transparent Heat Mirrors for Solar-Energy Applications, Fan & Bachner, *Applied Optics*, vol. 15, No. 4, Apr. 1976.

*Primary Examiner*—Margaret A. Focarino
*Attorney, Agent, or Firm*—Zarley, McKee, Thomte, Voorhees & Sease

[57] ABSTRACT

A visually transmitting solar energy absorbing thermal storage module includes a thermal storage liquid containment chamber defined by an interior solar absorber panel, an exterior transparent panel having a heat mirror surface substantially covering the exterior surface thereof and associated top, bottom and side walls. Evaporation of the thermal storage liquid is controlled by a low vapor pressure liquid layer that floats on and seals the top surface of the liquid. Porous filter plugs are placed in filler holes of the module. An algicide and a chelating compound are added to the liquid to control biological and chemical activity while retaining visual clarity. A plurality of modules may be supported in stacked relation by a support frame to form a thermal storage wall structure.

18 Claims, 2 Drawing Figures

SEMI-TRANSPARENT SOLAR ENERGY THERMAL STORAGE DEVICE

This invention was made in part under Department of Energy Contract Number W-7405-ENG-82.

This is a continuation of application Ser. No. 405,067, filed Aug. 4, 1982, now U.S. Pat. No. 4,523,577.

BACKGROUND OF THE INVENTION

The present invention is directed generally to a passive solar heating system for buildings and more particularly to a modular visually transmitting thermal storage device adapted to be placed interiorly of and adjacent to solar-gain fenestration.

Passive solar heating of buildings is attractive because of relatively low cost, long-term reliability and operational simplicity. A passive system absorbs and thermalizes solar energy and then transfers heat through a thermal storage medium to the building heating load without the use of active components such as mechanical pumps. Passive solar heating has commonly been accomplished by either a Trombe wall or a direct gain system. Both of these systems have problems which limit their applications, however. The Trombe walls necessarily obstruct the view and lighting from windows and also have such substantial weight and space requirements as to be impractical for retrofit construction in existing buildings. Large window direct gain systems, on the other hand, commonly have problems of glare, photodegradation and large fluctuations of air and mean radiant temperature.

Many of these problems were resolved by the new passive heating system of applicant's U.S. Pat. No. 4,286,576 which was issued on Sept. 1, 1981. That new system presents a visually transparent modular thermal storage wall that is analogous in heating function to a Trombe wall but analogous to tinted glazing in its daylighting, visual and direct gain performance. The system consists of transparent modules filled with a clear, water-based thermal storage liquid and a semi-transparent tinted solar absorber plate assembled into a wall structure of the desired dimensions for a given installation.

Whereas the new passive heating system of U.S. Pat. No. 4,286,576 is believed to have been a significant advance in the art, certain problems were encountered which are solved by the improvements of the present invention. Such problems relate to radiative summer heat gains and winter heat losses, evaporation and contamination of the transparent thermal storage liquid, construction costs and aesthetic considerations of the triple walled containment structure of the original design.

Accordingly, a primary object of the invention is to provide an improved visually transmitting passive solar energy thermalization and storage device.

Another object is to provide a visually transmitting thermal storage device having an exterior surface which is highly transmissive of radiation in the solar spectral region but highly reflective of longer wavelengths in the infrared region.

Another object is to provide a transparent solar energy thermal storage device which, although not hermetically sealed, includes means for preventing evaporation of the thermal storage liquid.

Another object is to provide a transparent solar energy thermal storage device including means for preventing contamination of the thermal storage liquid.

Another object is to provide a transparent solar energy thermal storage device which is simple and economical in construction, aesthetically attractive in appearance and flexible for interior integration in a wide range of building types.

Another object is to provide a visually transmitting solar energy thermal storage device which is practical for use in both retrofit and new construction.

SUMMARY OF THE INVENTION

The visually transparent passive solar heating device of the present invention includes a modular wall section in which a peripheral frame supports a containment vessel having a visually transmitting exterior panel and an interior panel of a visually transmitting solar absorber material. The modules may be stacked and arranged in a building adjacent to solar-gain fenestration to form a directly irradiated modular thermal storage wall structure which absorbs and thermalizes solar energy transmitted by the fenestration.

A heat mirror substantially covers the exterior surface of the exterior panel to reduce radiative winter heat loss and summer heat gain. Evaporation of the thermal storage liquid, which is usually water, is controlled by a low vapor pressure dynamic seal which is a liquid layer that floats on and seals the top surface of the thermal storage liquid. In addition, a porous filter plug is provided for the filler hole of the containment structure to prevent the entry of foreign matter into the water. Biological and chemical contamination of the water may be controlled by chemical additives such as an algicide and a chelating compound for keeping metal ions of the algicide in solution, thus insuring water clarity.

Finally, the present invention eliminates the third or interior panel of the structure so that the secondary function of the absorber panel as the interior containment panel results in a cost effective improvement of the aesthetic aspects of the invention.

DESCRIPTION OF THE PREFERRED EMBODIMENT

The visually transmitting passive solar heating system of the invention is preferably constructed in modular form.

Figure 1:
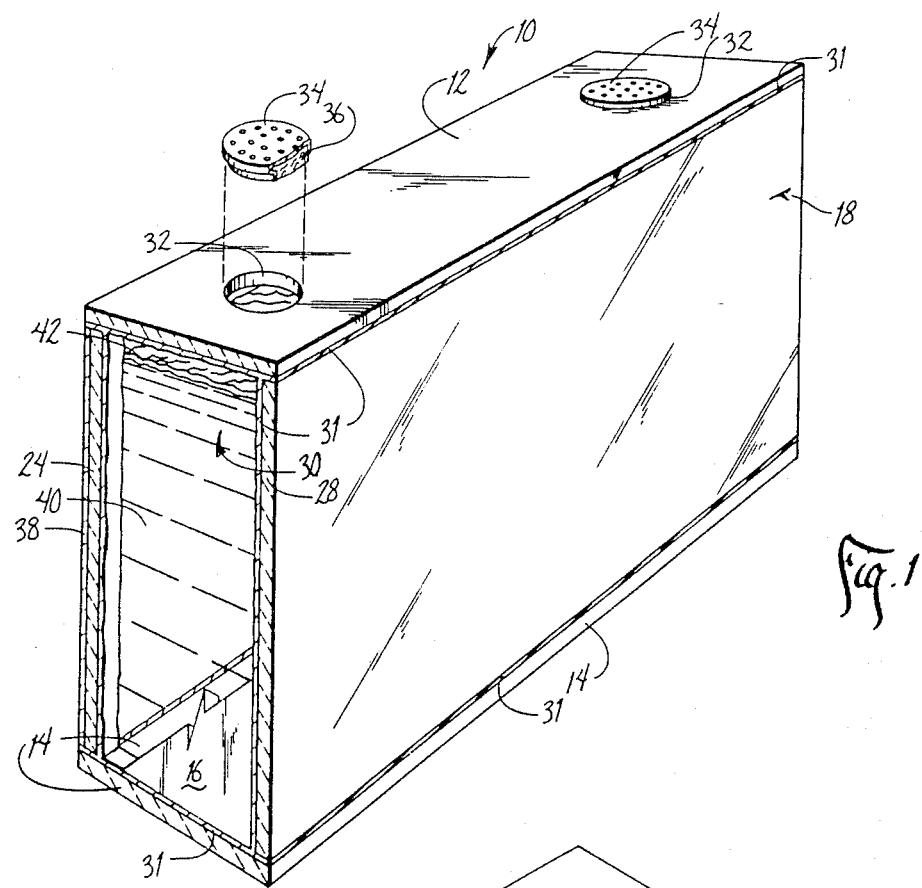
FIG. 1 is a perspective view of a module of the invention.

A typical module 10, shown in FIG. 1 includes a top wall 12, bottom wall 14, opposite sidewalls 16 and 18, an exterior panel 24 and an interior solar absorbing panel 28, all of which cooperate to define a liquid-tight containment chamber 30. The various walls and panels are preferably made of glass and are butt sealed together with a silicone adhesive sealant, indicated at 31. Such a sealant is commercially available from General Electric Company and designated RTV 108. This is a standard aquarium construction technique and has provided reliable leak free containment without additional structural reinforcement.

The interior solar absorbing panel 28 is preferably made of glass with a neutral absorbing substance added to it. The neutral substance results in uniform absorption across the visual spectrum. A suitable material is the standard grey tinted glass (transmission 31%) manufactured by Pittsburgh Plate Glass Company under the trademark Greylite.

Access to the chamber 30 is provided through a pair of filler holes 32 in top wall 18. These holes are closed with perforated plastic plugs or caps 34 equipped with filters 36 to reduce water contamination by airborne particles. The filler holes 32 further enable pressure equalization between the chamber 30 and the ambient atmosphere.

An important improvement of the present invention is the addition of a heat mirror 38 which substantially covers the exterior surface of exterior panel 24. The heat mirror 38 is a transmitting selective coating which ideally is transparent to sunlight but strongly reflecting or nonradiating for longer wavelength radiation that causes radiative heat losses in passive systems. The heat mirror surface is formed by depositing a thin film coating on a glass panel by a sputtering process. Suitable materials for the coating are copper tin oxide and indium tin oxide. Glass panels with heat mirror surfaces are commercially available from the Guardian Glass Co. in Carlton, Mich.

In practice, heat mirrors have not been made that are actually completely transparent to solar radiation. A typical heat mirror surface has high reflectivity and low emissivity in the infrared range and the following approximate optical properties in the solar spectral region: transmission 65%, reflection 15% and absorption 20%.

Conventionally, heat mirror surfaces have been used in double glazing systems where they are usually located on the outer surface of the inner pane such that solar energy absorbed in the surface makes only a small contribution to the mean radiant temperature of the interior. In the present invention, on the other hand, the heat mirror surface 38 is incorporated on the exterior facing surface of the exterior thermal storage panel 24. In this configuration, heat due to solar absorption in the surface is conducted into storage and the storage experiences less radiative loss to the exterior due to the low emissivity heat mirror surface 38. In the summer, the surface reflects heat thus reducing the heat load of the interior. In addition to reducing radiative heat transfer between the exterior and interior of a building, this new application for a heat mirror has another important implication. It allows over a 50% larger permissible absorption of solar energy in the heat mirror than is acceptable in normal glazing applications where window heating and thermal breakage are problems.

Another improvement of the present invention over the system of applicant's prior U.S. Pat. No. 4,286,576 is the elimination of the third or interiorly situated panel. The previous design had an absorber plate centered between separate interior and exterior module walls to enhance thermal performance. Calculations have, however, recently shown that performance is insensitive to absorber plate location. Hence, one plate of glass can be eliminated by combining the solar absorber plate 28 with the interior facing module wall for economy. Aesthetics are also improved because all light entering the interior must pass through the absorber plate 28. In the prior design, light at the edges of the module could miss the absorber plate and create a somewhat disturbing optical effect.

The present invention furthermore provides a water quality control strategy to insure that excellent visual clarity is obtained with the use of pure water as the thermal storage liquid in the module 10. Problems encountered with earlier prototypes included air bubbles, algae growth, suspended precipitants of minerals and evaporation.

Air bubbles that attach to the interior glass surfaces shortly after filling the modules combine into larger ones and float to the surface within several weeks. This process can be accelerated using heat lamps that clear the bubbles in a matter of hours.

It has been found that algae can be controlled by treating the water 40 with a common algicide such as copper sulfate at a rate of about 100 parts per million. Precipitants can likewise be controlled by treating the water 40 with a chellating compound such as ethylenediamine tetracetate (EDTA) at a rate of approximately 150 parts per million.

Water evaporation is not a significant short term problem for modules but it does create an undesirable requirement for servicing the modules unless the evaporation can be retarded. In the present invention, a thin layer of low vapor pressure liquid 42 floats on and seals the top surface of the body of water 40 from the atmosphere. Fluorosilicone oil is a suitable liquid because it is not biologically active and it has a low vapor pressure and is compatible with the silicone glass bonding adhesive.

Figure 2:
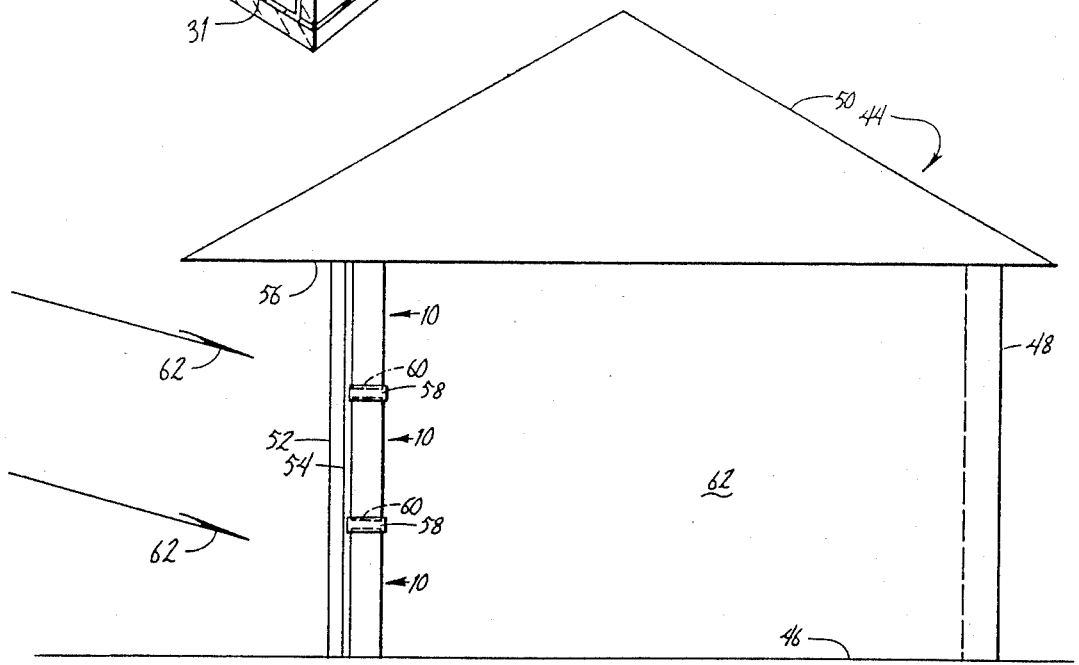
FIG. 2 is a diagrammatic side sectional view of a building including a wall structure formed of modules of the invention.

FIG. 2 illustrates a typical installation of the invention. A building 44 includes a floor 46, walls 48 and a roof structure 50. One of the walls has large south facing windows including double glazing indicated at 52 and 54. Such windows are typical of present direct gain passive solar configurations and may be provided with a rather substantial roof overhang 56 to block the path of the summer sun into the interior to thereby reduce the solar cooling load in the summer.

The modules 10 of the present invention are arranged in side by side stacked relation on a support frame 58. The frame 58 may be constructed of standard extruded aluminum T-section and/or angle stock that is black anodized and joined with screw fasteners to define peripheral frame sections for receiving the modules. Foam rubber strips 60 or other suitable insulation may be interposed between the frame 58 and modules 10 to allow for thermal expansion and to provide cushioning as well as an air seal. The appearance of the frame and module assembly compares favorably with that of high quality glass and aluminum glazing systems common to contemporary buildings. Furthermore, the modules may be constructed having dimensions of 61 centimeters wide and 41 centimeters high so as to be compatible with common window sizes in this country and allow individual modules to be removed easily if necessary.

The frame and module assembly as thus described forms an attractive modular thermal storage wall structure that has visual transmission properties similar to tinted glazing. The modular wall structure is located in the building 44 closely adjacent to solar-gain fenestration where it absorbs a large fraction of the sunlight 62 in the partially absorbing plates 28 incorporated in the water filled modules 10. Heat produced by absorption is stored in the water and released to the building interior 62 when the temperature falls below that of storage during the heating season. In the summer, the system's thermal mass attenuates interior temperature swings.

The system of the present invention is designed for on site assembly in new or retrofitted buildings. Water based storage reduces weight and space requirements, relative to concrete storage, by factors of approximately 4 and 2, respectively. The modular wall structure of the invention does not obstruct windows and thereby allows the fenestration functions of exterior view and daylighting to be retained. The light attenuation and thermal storage functions of the invention furthermore reduce the problems of glare, photodegradation and large fluctuations of air and mean radiant temperature common to many large window direct gain systems.

Whereas a preferred embodiment of the invention has been shown and described herein, it will be apparent that many modifications, substitutions and alterations may be made which are within the intended broad scope of the appended claims.

Thus there has been shown and described a visually transmitting solar energy thermal storage device which accomplishes at least all of the stated objects.

I claim:

1. A visually transmitting solar energy absorbing thermal storage device comprising:
   a visually transmitting exterior panel having interior and exterior surfaces,
   a visually transmitting solar absorber panel located interiorally of said exterior panel and substantially parallel thereto, said absorber panel being made of a visually transparent material with a neutral absorbing substance added to it,
   sealing means between the exterior panel and absorber panel for forming a liquid-tight containment chamber therebetween adapted for receiving a visually transmitting thermal storage liquid, said sealing means comprising peripheral containment panels and said device having a filler hole in an upper portion of one of said panels for introduction of said thermal storage liquid therethrough into said chamber,
   a porous filter plug matingly fit within said filler hole for preventing the introduction of containments into said containment chamber and for equalizing the pressure between said chamber and the ambient atmosphere, and
   a heat mirror substantially covering a surface of said exterior panel for reducing radiative heat transfer through said device.

2. The device of claim 1 wherein said heat mirror substantially covers said exterior surface.

3. The device of claim 2 wherein said heat mirror has the following approximate optical properties in the solar spectral region: transmission 65%, reflection 15% and absorption 20%.

4. The device of claim 3 wherein said heat mirror has high reflectivity and low emissivity in the infra-red range.

5. The device of claim 1 wherein said absorber panel substantially defines the interior surface of said device, thereby being exposed to the ambient atmosphere on the interior side of said device.

6. The device of claim 1 further comprising a visually transmitting thermal storage liquid substantially filling said containment chamber.

7. The device of claim 6 further comprising a low vapor pressure liquid layer that floats on and seals the top surface of the thermal storage liquid.

8. The device of claim 7 wherein said low vapor pressure liquid layer comprises fluorosilicone oil.

9. The device of claim 6 wherein said thermal storage liquid includes an algicide.

10. The device of claim 9 wherein said algicide comprises copper sulfate and is dispersed in said thermal storage liquid at a rate of approximately 100 parts per million.

11. The device of claim 6 wherein said thermal storage liquid includes a chelating compound for keeping metal ions in solution.

12. The device of claim 11 wherein said chelating compound comprises disodium ethylenediamine tracetate and is dispersed in said thermal storage liquid at a rate of approximately 150 parts per million.

13. The device of claim 1 wherein said thermal storage liquid includes an algicide.

14. The device of claim 1 wherein said thermal storage liquid includes a chelating compound for keeping metal ions in solution.

15. The device of claim 1 further comprising a heat mirror substantially covering the exterior surface of said exterior panel.

16. The device of claim 1 further comprising a porous filter plug in said filler hole for preventing the introduction of contaminants into the containment chamber.

17. A visually transmitting solar energy absorbing thermal storage device comprising,
   a visually transmitting exterior panel having interior and exterior surfaces,
   a visually transmitting solar absorber panel located interiorally of said exterior panel and substantially parallel thereto, said absorber panel being made of a visually transparent material with a neutral absorbing substance added to it,
   sealing means between the exterior panel and absorber panel for forming a liquid-tight containment chamber therebetween adapted for receiving a visually transmitting thermal storage liquid, said sealing means comprising peripheral containment panels and said device having a filler hole in an upper portion of one of said panels for introduction of said thermal storage liquid therethrough into said chamber,
   a heat mirror substantially covering a surface of said exterior panel for reducing radiative heat transfer through said device,
   a visually transmitting thermal storage liquid substantially filling said containment chamber, and
   a low vapor pressure liquid layer that floats on and seals the top surface of the thermal storage liquid.

18. A visually transmitting solar energy absorbing thermal storage device comprising,
   a visually transmitting exterior panel having interior and exterior surfaces,
   a visually transmitting solar absorber panel located interiorally of said exterior panel and substantially parallel thereto, said absorber panel being made of a visually transparent material with a neutral absorbing substance added to it,
   sealing means between the exterior panel and absorber panel for forming a liquid-tight containment chamber therebetween adapted for receiving a visually transmitting thermal storage liquid, said sealing means comprising peripheral containment panels and said device having a filler hole in an upper portion of one of said panels for introduction of said thermal storage liquid therethrough into said chamber,
   a heat mirror substantially covering a surface of said exterior panel for reducing radiative heat transfer through said device,
   a visually transmitting thermal storage liquid substantially filling said containment chamber, and
   said thermal storage liquid including a chelating compound for keeping metal ions in solution.

* * * * *